United States Patent [19]
Repenning

[11] 4,010,230
[45] Mar. 1, 1977

[54] METHOD FOR PRODUCING A DRUM TYPE CONTAINER WITH AIR CUSHION

[75] Inventor: William Repenning, Haddonfield, N.J.

[73] Assignee: Natico, Inc., Chicago, Ill.

[22] Filed: Nov. 29, 1974

[21] Appl. No.: 528,202

Related U.S. Application Data

[63] Continuation-in-part of Ser. No. 342,696, March 19, 1973, Pat. No. 3,893,882.

[52] U.S. Cl. .................................. 264/25; 156/287; 264/26; 264/92; 264/249; 264/269; 425/388; 425/504

[51] Int. Cl.² ................. B29C 17/04; B29C 25/00; B29D 3/02

[58] Field of Search ................. 264/25, 26, 89, 90, 264/92–94, 98, 99, 249, 267–269, 237, 348; 425/388, 503, 504; 156/215, 245, 287, 272–273

[56] References Cited

UNITED STATES PATENTS

| | | | |
|---|---|---|---|
| 3,159,695 | 12/1964 | Behringer | 264/92 X |
| 3,318,985 | 5/1967 | Turner et al. | 264/269 X |
| 3,338,020 | 8/1967 | McGee | 264/92 X |
| 3,366,019 | 1/1968 | McGee | 425/388 X |

*Primary Examiner*—Jan H. Silbaugh
*Attorney, Agent, or Firm*—McDougall, Hersh & Scott

[57] ABSTRACT

A method for producing a container of large capacity formed of an outer shell of structurally strong material and an inner plastic container joined at its upper end portion about the rim of the shell and resting at its bottom end on the bottom wall of the shell with an air cushion between the outer side walls of the plastic container and the inner walls of the shell. A sheet of the plastic is vacuum formed within the outer shell and then allowed to shrink in order to form the air cushion.

10 Claims, 7 Drawing Figures

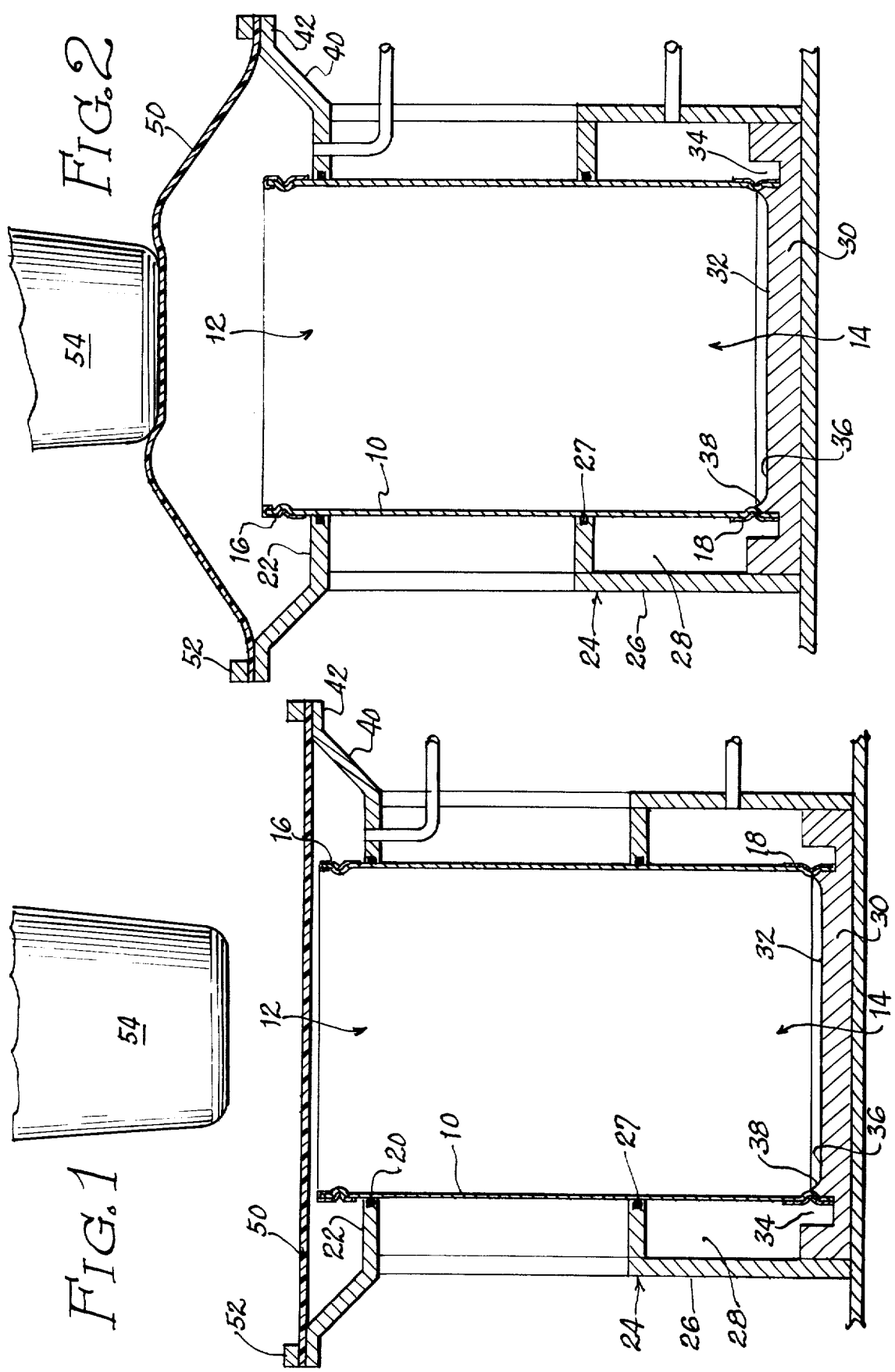

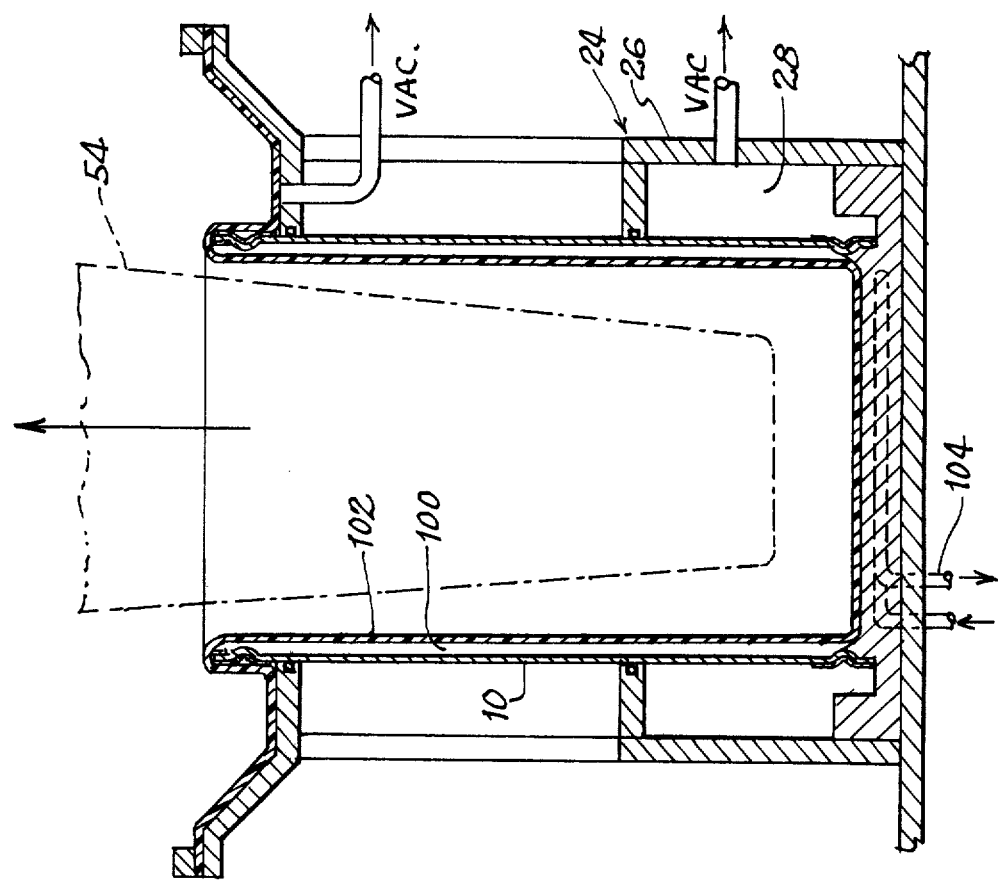
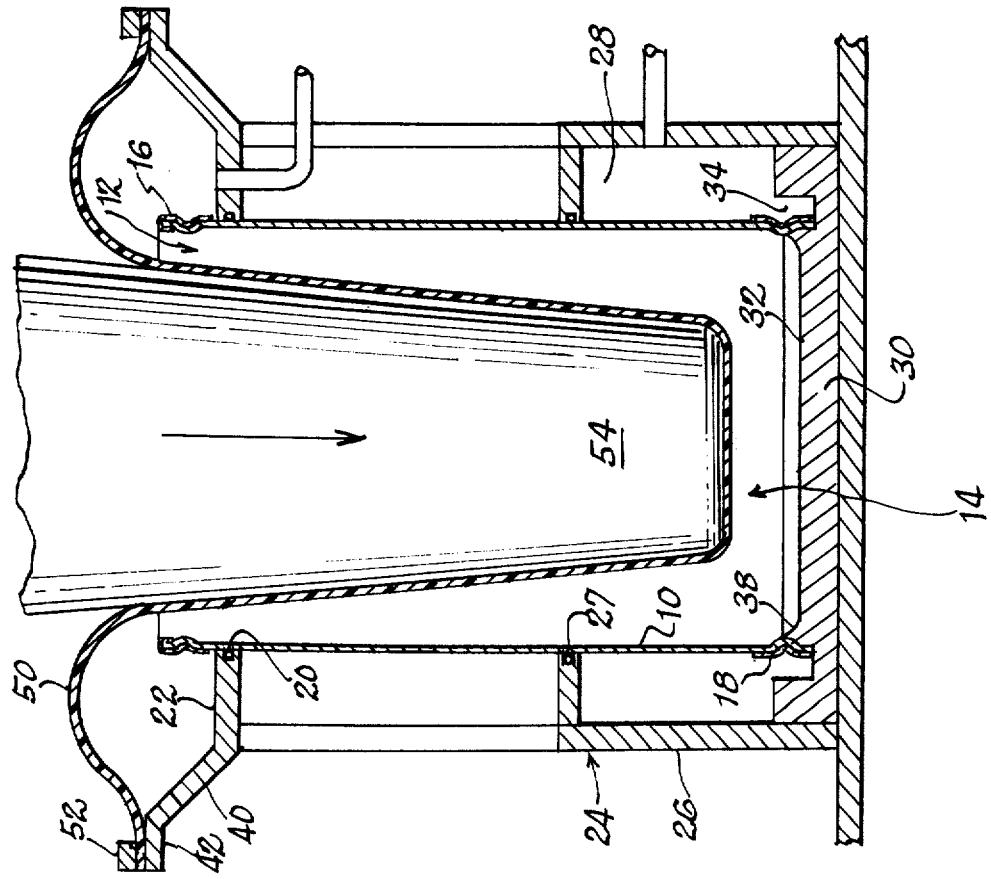

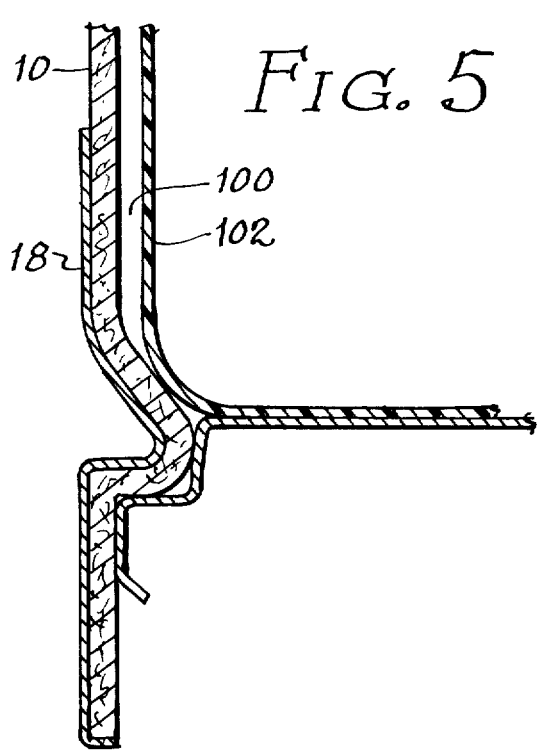
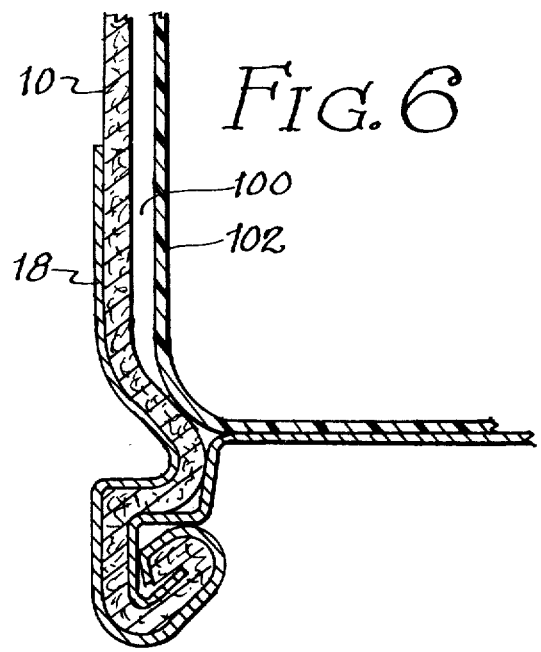
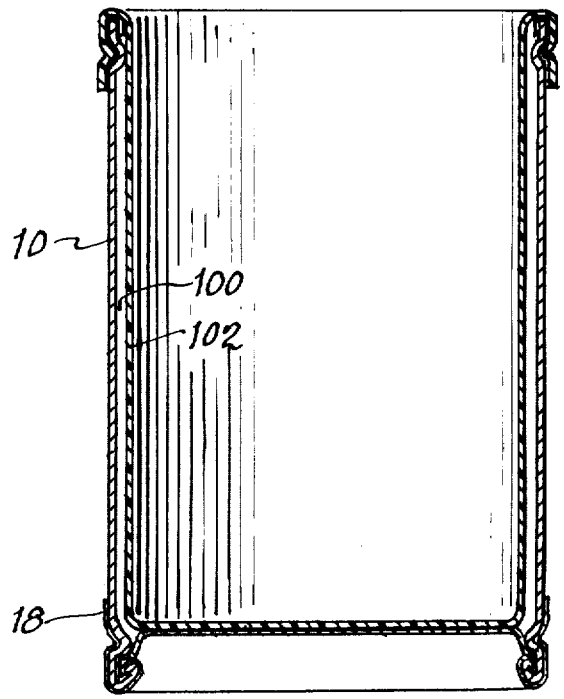

METHOD FOR PRODUCING A DRUM TYPE CONTAINER WITH AIR CUSHION

This is a continuation-in-part of my copending application Ser. No. 342,696, filed Mar. 19, 1973, now U.S. Pat. No. 3,893,882, entitled "Method and Apparatus for Lining Drums with Plastic Material".

This invention relates to a method for producing drums of large capacity and more particularly to a method for producing the combination of a drum casing formed of a structurally strong and relatively rigid material and a container of thin plastic film material mounted within the casing and which relies upon the casing for support.

The invention will hereinafter be described with reference to drums of large capacity in which the structurally strong outer shell is formed of conventional materials such as wood, as in a wooden barrel; metal, such as in a steel drum; or fiberboard, such as in the manufacture of fiber drums. Such drums have been formed with plastic linings whereby the use of such drums of large capacity has been expanded to the storage and transportation of fluids or liquids or fluids and particulate materials which could not otherwise be housed within unlined drums because of reaction with the materials making up the drum.

Plastic lined drums have heretofore been produced, as described in U.S. Pat. No. 3,027,044, in which the plastic liner is formed separate and apart from the drum and dimensioned to enable the liner to be inserted through the open end of the drum for receipt in fitting relation within the drum. The difficulties that have been encountered in the manufacture of plastic lined drums of the type described include the aggravations which arise from leaking liners. Such leakage gives rise to damage and loss of materials, as well as to problems generated by the escaping content materials. Such leakages find their inception not only in the preparation of the liner but in the handling of the liner from the time of its manufacture to installation in position of use in the drum.

More recently, as described in U.S. Pat. No. 3,126,797, attempts have been made to minimize the amount of handling of the plastic liner by forming the liner in situ in the drum. As described in the aforementioned patent, a tubular parison of plastic material is extruded into the open end of a tubular drum shell; the top and bottom ends of the parison are sealed; the tubular drum shell is embraced by mold walls for support; and then air is blown under pressure into the interior of the extruded parison to expand the plastic material into engagement with the mold-backed walls of the shell, whereupon a bonded relationship is established between the expanded plastic material and the shell walls.

There are a number of objectionable features to plastic lined drums produced in the manner described and to the method and means for the manufacture of same. For example, the use of air under pressure for blowing the plastic parison outwardly for expansion into engagement with the walls of the drum requires the confinement of the drum within a complex mold for support of the outer wall. Actuation of the mold into and out of engagement with the drum represents a molding operation which is expensive and time consuming, thereby to limit the number of plastic lined drums that can be produced per unit time.

The described technique requires an extrusion operation with all of its machine costs and expertness required for operation, to extrude the plastic parison into the open shell, thereby to include a molding operation as well as a forming operation in the preparation of the plastic liner.

Other problems which arise in the described method of manufacture are occasioned by the temperature of the extruded plastic material whereby considerable time is required adequately to cool down the extruded and blown plastic liner, and the need to make use of a water cooled mold to enhance the removal of heat from the expanded plastic liner with a view towards reducing the cool-down time cycle.

Finally, as described in the aforementioned patent, the plasticity of the blown liner causes the liner to become interbonded with the interior wall of the drum. The established interbonded relation interties the plastic liner to the drum shell whereby deformations or indentations of the shell, due to impact or otherwise, are directly transmitted to the inflexibly bonded liner with possible rupture or damage thereof.

In my aforementioned copending application, description is made of a method and apparatus for producing plastic lined drums of large capacity which overcomes many of the deficiencies heretofore described in the manufacture of plastic lined drums.

It is an object of this invention to produce and to provide a method for producing drums of large capacity which embody still further improvements from the standpoint of the structural features of the drum and its increased ability to withstand impact, deformation, or sudden shifting of a load, thereby to increase the utility of the drum and the ability of the drum to maintain the desired sealed relationship with respect to the materials that are contained therein.

These and other objects and advantages of this invention will hereinafter appear and for purposes of illustration, but not of limitation, an embodiment of the invention is shown in the accompany drawings in which:

FIG. 1 is a schematic elevational view showing the relative arrangement of elements in an initial stage of manufacture of the drum in accordance with the practice of this invention;

FIG. 2 is a schematic sectional elevational view similar to that of FIG. 1 showing the relationship of elements during an intermediate stage of manufacture;

FIG. 3 is a sectional elevational view showing the arrangement of elements during a stage of manufacture subsequent to the operation illustrated in FIG. 2;

FIG. 4 is a sectional view similar to that of FIGS. 1-3 showing the arrangement of elements during a final stage of manufacture of the drum;

FIG. 5 is a schematic elevational view showing the arrangement of elements in a lower edge portion of the drum prior to joinder of the bottom wall to the side walls, as by means of a chime;

FIG. 6 is a sectional elevational view of the portion shown in FIG., 5 with the bottom wall joined to the side walls of the drum; and FIG. 7 is a sectional elevational view showing the drum produced in accordance with the practice of this invention.

In accordance with the practice of this invention, the described improvement in impact strength and resistance to breakthrough is achieved when instead of making use of a plastic material that internally lines the wall of the drum, use is made of a plastic liner in the form of a separate container of flexible material which engages the drum in substantially sealed relation about their respective edge portions and in which the bottom wall of the internal plastic container rests on the bottom wall of the drum, but in which a sealed spaced relation exists between the outer side walls of the plastic container and the inner side walls of the drum to define an air cushion therebetween. As a result, the internal plastic container more or less floats within the outer shell of structurally strong rigid material for support whereby the load generated by sudden impact, which might cause deformation of the shell portion of the drum, will be distributed before transmission to the flexible internal container, while at the same time permitting relative movement between the shell and container further to minimize the effect of impact and deformation. The air cushion between the shell and plastic container operates also to deaden the effect of a sudden shift in load responsive to fall of the drum or tumbling of the drum during transportation.

A drum of large capacity, formed of a rigid shell of structurally strong material and an internal container of flexible plastic material, with an air cushion in between, except for the sealed interengagement about their respective upper edge portions, can be produced in the manner described in the aforementioned copending application with modification to provide the air cushion in between.

In accordance with the practice of the aforementioned copending application, the shell 10, which is open at the top 12 and at the bottom 14, and which forms the side wall of the completed drum D, is used as the mold. The shell 10, with the top chime 16 about the upper edge and the bottom chime 18 about the bottom edge is inserted through an opening 20 in the top wall 22 of a mold box 24. The mold box is dimensioned between side walls 26 to be greater than the dimension between the corresponding side walls of the shell 10 to provide an open space 28 therebetween while a mold pedestal or plug 30 is provided at the bottom of the box 24 on which the lower edge of the shell is received to define the bottom wall 32 of the shell mold. The plug or pedestal is provided with a recess 34 adjacent the bottom edge of the shell 10 with the recessed portion contoured to receive the free end portion of the lower chime 18 when the shell 10 is at rest on the pedestal.

The pedestal is formed with a central flat portion 36 which terminates in an upwardly and outwardly extending curvilinear portion 38 which merges into the curvilinear inwardly extending portion at the lower edge of the shell 10 and the attached chime 18. The flat portion 36 of the pedestal is adapted to be spaced from the top wall of the box 24 by an amount less than the length of the shell, preferably by an amount corresponding to the length of the upper portion to which the upper chime is attached so that the portion with the upper chime will extend outwardly beyond the top wall 22 when the shell is at rest on the pedestal. The flat portion 36 which, with the shell, forms the bottom wall of the mold, is spaced below the portion of the shell normally aligned crosswise with the bottom wall of the drum by an amount calculated to correspond to the amount of shrinkage which takes place through the length of the plastic material during temperature change from plastic molding temperature to ambient temperature so that, at ambient temperature, the liner formed in the mold will freely rest on the bottom wall of the drum for support.

The box 24 is formed with an upwardly and outwardly extending flanged portion 40 which terminates in a horizontally disposed clamping lip 42. The box is provided with means for generating sub-atmospheric pressure in the space between the shell and the box with channels through the pedestal and through portions of the top wall, beyond the opening and within the flanged portions for transmitting sub-atmospheric conditions therethrough. For this purpose, one or more passages through the side wall of the box and, if desired, through the pedestal, are connected to a vacuum pump or other vacuum generating means. Means, which may include the same passages, are provided for introducing a gaseous media, such as air, into the space for purposes which will hereinafter be described.

As shown in FIG. 1, a sheet 50 of thermoplastic material of suitable thickness is arranged to overlie the box and is clamped in sealing relation at the lip 42, as by clamping means 52. For this purpose, use can be made, for example, of low, medium, or high density polyethylene, polypropylene, polyacrylic and polyalkylacrylic sheet plastics, ionomers, polystyrene, polyamides (Nylon), polyesters (Mylar), polytetrafluoroethylene (Teflon), polyvinyl homopolymers and copolymers and the like, in formulating the plastic sheet, the particular plastic material selected depending on its imperviousness and resistance to solution or attack by the chemical, liquid or other materials to be packaged in contact therewith in the plastic lined drum.

Prior to sealing engagement of the thermoplastic sheet 50 in position of use, the thermoplastic sheet 50 is heated to an elevated temperature, which is above the softening point temperature but below liquefaction temperature, such as a temperature 10°–50° C above its softening point temperature. This reduces the sheet to a stretchable thermoplastic stage. Heating to elevated temperature may be accomplished by a hot air heater passing the sheet through a hot air oven, or by positioning heating elements adjacent the surface of the plastic sheet, but it is preferred to make use of a bank of infrared heating lamps which may be moved into and out of position over the mounted film for heating the plastic sheet by radiation. Instead, use can be made of such more rapid heating means as high frequency heating and the like uniformly to raise the temperature of the plastic sheet to the desired temperature range.

In order to prevent sagging or uncontrolled collapse of the plastic sheet 50 during mounting and the initial stages of the molding operation, super-atmospheric conditions are maintained within the sealed space, as by the introduction of air or other gas into the interior of the box, as by means of the passages previously described. Sufficient air or gas is introduced to cause the sheet of thermoplastic material to billow upwardly in the direction away from the interior of the mold, as illustrated in FIG. 2. More significantly, billowing the sheet outwardly as an initial step in molding provides more effective control of the stretching of the sheet to include all areas of the sheet before confinement in the mold.

In the next step for molding the liner, the top side of the sheet is engaged centrally by a plug or ram 54 which is actuated for downward displacement into the interior of the shell, preferably through the major portion of its length, but short of the bottom wall 32 of the mold. This is carried out preferably, though not necessarily, while the mold box is still being maintained under positive pressure whereby the thermoplastic sheet is retained in surface contact with the plug for deep drawing during downward displacement of the plug into the mold, as illustrated in FIG. 3. This operates to cause the plastic sheet to embrace the ram or plug 54 for positive displacement of the sheet into the interior of the shell controllably to stretch the sheet during the initial stages of the sheet forming operation. This amounts to a deep drawing step in which the major portion of the sheet molding is carried out. The deep drawing ram or plug need not be heated, but it is preferred to make use of a plug heated to an elevated temperature which corresponds to or is slightly below (up to 50° C below) the temperature of the plastic sheet so as to avoid cooling or freezing of the portions of the sheet contacted by the plug which might otherwise interfere with the desired uniform stretching of the sheet during molding or its subsequent attenuation during vacuum forming. Sections of the plug 54 can be provided, as desired, with heating or with cooling means for purposes of controlling wall thickness or the amount of stretch of the plastic material, as by cooling to minimize the amount of stretch with corresponding increase in wall thickness, or as by heating to maximize the amount of stretch with corresponding decrease in wall thickness.

The molding operation is completed by reversing the conditions existing in the cavity by replacing positive pressure conditions with sub-atmospheric or vacuum conditions. This can be achieved by communicating the interior of the mold box, through the passages, with evacuating means. This places the entire portion of the mold between the sheet and the mold box under vacuum conditions for attenuation of the sheet by vacuum forming in the direction toward the mold walls, including the bottom wall of the mold, the inner side walls of the shell, and about the upper chime and onto the flanged portion 22 of the mold box up to the sealing clamp, as shown in FIG. 4. The vacuum conditions can be supplemented by creating positive pressure conditions, as by blowing into the area formerly occupied by the plug.

Vacuum forming operates to draw the plastic sheet away from the plug 54, to free the plug for return to retracted position above and out of the path of the molded assembly.

The frame member 26 need not completely enclose the shell 10, as illustrated in the parent application. Instead, it is sufficient if the frame members merely enclose a lower portion of the shell and te upper end portion of the shell with means such as O-rings 27 for effecting a sealing engagement between the frame member and the shell. Thus a vacuum will be drawn in the sealed portions and will operate through the shell to effect the desired vacuum drawing of the plastic film to stretch the film.

It will be understood also that billowing the plastic film prior to displacement within the shell, and plug assist during molding of the plastic film into the shell, as illustrated in FIGS. 2 and 3, are not essential to the molding operation. Instead, displacement of the plastic film into the interior of the shell can be achieved entirely in response to vacuum drawing while the plastic film is at an elevated temperature sufficient to enable it to be stretched.

In accordance with the practice of this invention, the air cushion 100 between the side walls of the formed inner plastic container 102 and the shell 10 is achieved by vacuum drawing to stretch the film until it just engages the interior walls of the shell but without a bonded relation being established therebetween. Thereafter, the upper portion of the film which extends about the upper edge of the shell, to embrace the rim and the adjacent outer side walls, is rapidly cooled down, as by means of a water spray, to a temperature below the plastic stage thereby to set the plastic film in engagement with the upper rim of the shell.

The flat portion 36 which, with the shell, forms the bottom wall of the mold is provided with cooling means, such as passages 104, for transmission of a heat exchange liquid adapted to maintain the pedestal at a temperature below the plastic stage for the film materials so that the film will become set almost immediately upon being stretched into engagement with the pedestal. For polyethylene or polypropylene having a softening point at about 104° C, the upper portion and the bottom wall portion of the plastic film should be cooled to a temperature of 80° to 100° C or less and preferably by cooling to a temperature of 65° to 80° C or less.

Best results are secured when the surface of the pedestal is formed with a surface roughness of at least 100 microinches. Such surface roughness enhances control to obtain a desirable bottom wall thickness and prevent removal of material from the bottom wall during stretching and subsequent shrinkage so as to form a part of the side wall.

Vacuum for stretching the film is cut off while the portion of the film forming the side wall portions is at a temperature above the softening point temperature for the plastic material and preferably about 20–40° above the softening point temperature. For polyethylene or polypropylene having a softening point of about 104° C, this would be at a temperature of about 140° ± 10° C. Under these conditions, shrinkage occurs primarily in the lengthwise direction and in the circumferential direction during cool-down of the film. The formation of the upper edge of the film outwardly and downwardly over the top rim of the shell militates against downward displacement from the upper edge and limits shrinkage from the bottom side thereby to raise the bottom wall portion to the level of the bottom wall of the container and shrinkage in the circumferential direction operates to decrease the diameter of the cylindrical portion defining the side walls to an amount less than the shell diameter. As a result, an annular space 100 is formed between the side walls of the stretched film and the side walls of the shell. By reason of the engagement of the upper edge portion of the film about the rim of the shell, the stretched film is maintained within the shell as a substantially independent container with the space between the respective side walls of the shell and container functioning as an air cushion which provides the advantages heretofore described while still relying upon the shell for support of load when the film container comes into contact with the shell wall under load.

Thus the useful life of the drum is markedly increased while also increasing the ability of the loaded drum to resist sudden impact and deformation to which it is normally subjected during transportation and use.

It will be apparent from the foregoing that I have provided a new and improved container of large capacity and a simple and efficient means for the manufacture of same.

It will be understood that changes may be made in the details of construction, arrangement and operation without departing from the spirit of the invention, especially as defined in the following claims.

I claim:

1. In the method of producing a drum container of large capacity formed of a drum forming shell of structurally strong material open at the upper end and closed at the bottom end by a bottom wall, and an inner container of flexible thin plastic joined at its upper end portion about the upper rim of the shell, dimensioned to have a length corresponding to the length of the shell so that the bottom end will rest upon the bottom wall of the shell, and a diameter less than the diameter of the shell to provide an annular space between the outer side walls of the plastic container and the inner side walls of the shell to define an air cushion in between, the steps of positioning the cylindrical outer drum shell, while open at the top and closed at the bottom, in a frame member which engages the outer walls of the shell in sealing relation, heating to the stretchable stage a film of thermoplastic material dimensioned to extend across the open top end of the shell and for a distance beyond, effecting a sealing engagement between the portion of the film extending between the open end of the shell and the frame, drawing a vacuum in the space between the interior of the shell and the heated film to stretch the film by vacuum forming into the interior of the shell and towards the walls thereof until the film just engages the walls without bonding thereto and about the upper rim of the shell, terminating the vacuum drawing while the film material is still above its stretchable stage, rapidly cooling the portions of the film stretched about the upper rim of the shell and in engagement with the bottom wall while the remainder of the film is still in the stretchable stage, and allowing the remainder of the film to cool down to set stage with corresponding shrinkage in the circumferential direction to form an annular air space between the outer walls of the film and the side walls of the shell to function as an air cushion.

2. The method as claimed in claim 1 which includes the step of displacing a plug member vertically downwardly into the interior of the shell through the open end at the top towards the bottom for plug assist of said film stretching by vacuum forming.

3. The method as claimed in claim 2 in which the plug member is heated to an elevated temperature.

4. The method as claimed in claim 1 in which the film is stretched lengthwise, prior to setting at the rim and the bottom wall, for a length greater than the distance from the top rim to the bottom wall of the drum by an amount calculated to correspond with the shrinkage of the film in the vertical direction during cooling to set stage whereby the film will rest on the bottom wall of the drum while an air cushion space will be formed between the side walls of the drum and the film during shrinkage upon cooling.

5. The method as claimed in claim 4 in which the frame includes a pedestal which forms the bottom wall on which the shell rests during the forming of the film and in which the pedestal is spaced from the rim by an amount that is greater than the length of the shell corresponding to the shrinkage calculated to take place during cool down of the stretched film from molding temperature to ambient temperature.

6. The method as claimed in claim 1 in which the thermoplastic film is preheated prior to positioning on the shell and separate and apart therefrom.

7. The method as claimed in claim 1 in which the thermoplastic film is preheated to stretchable stage by hot air.

8. The method as claimed in claim 1 in which the thermoplastic film is preheated to stretchable stage by infra-red ray lamps.

9. The method as claimed in claim 1 in which the thermoplastic film is preheated to stretchable stage by high frequency heating.

10. The method as claimed in claim 1 in which stretching of the film is terminated while the temperature of the film is 20° to 40° F above the softening point for the plastic material.

* * * * *